(No Model.)

H. L. MOULTON.
Mechanical Movement.

No. 232,538. Patented Sept. 21, 1880.

Witnesses:
James F Tobin
Harry Smith.

Inventor:
Hamilton L. Moulton,
by his Attorneys,
Howson & Son.

UNITED STATES PATENT OFFICE.

HAMILTON L. MOULTON, OF CAMDEN, NEW JERSEY, ASSIGNOR TO THE JAMES SMITH WOOLEN MACHINERY COMPANY, OF PHILADELPHIA, PA.

MECHANICAL MOVEMENT.

SPECIFICATION forming part of Letters Patent No. 232,538, dated September 21, 1880.

Application filed August 23, 1880. (No model.)

*To all whom it may concern:*

Be it known that I, HAMILTON L. MOULTON, a citizen of the United States, residing in Camden, New Jersey, have invented a Mechanical Movement, of which the following is a specification.

My invention consists of a mechanical movement to be embodied in any organized machine in which a bar, lever, or other device has to be operated by positive and determinate action at intervals, which may be varied as circumstances may require.

Figure 1:
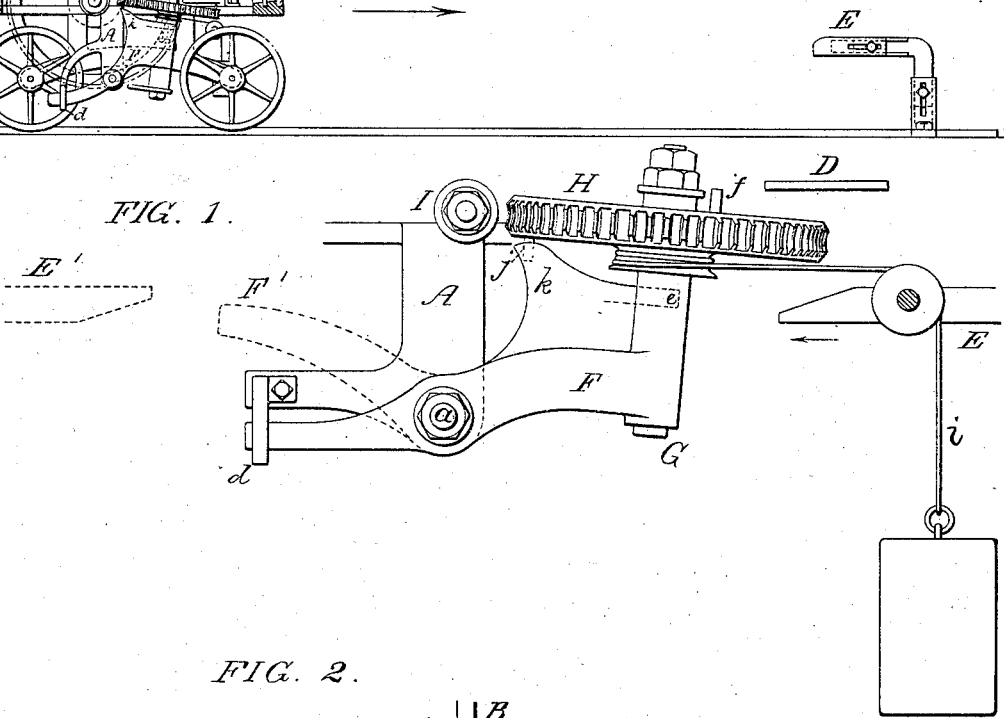
Figure 2:
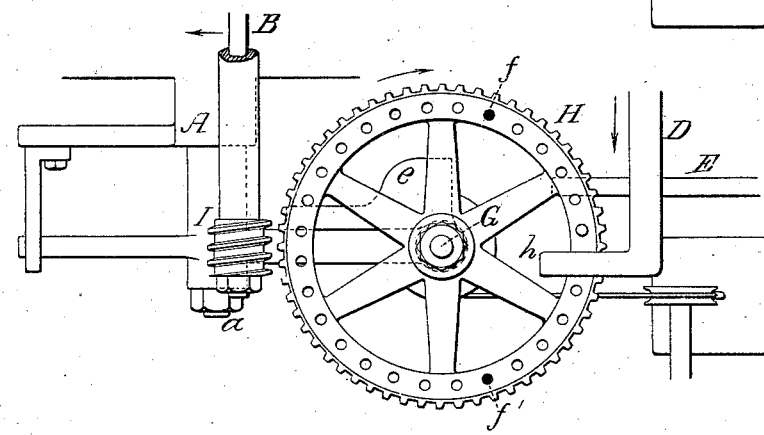

In the accompanying drawings, Figure 1 is an elevation of my improved mechanical movement; Fig. 2, a plan view, and Fig. 3 a diagram illustrating the application of my improvement to a self-acting mule.

We will suppose, in the first place, that A, Figs. 1 and 2, represents part of the fixed frame of an organized machine; B, a shaft adapted to suitable bearings in the frame and rotating continuously in the direction of its arrow; and D, a sliding rod, to which a positive movement in the direction of its arrow, Fig. 2, has to be imparted by the driving-shaft at intervals, which may be varied; or D may represent part of a lever or other object to which the desired intermittent positive motion has to be imparted, and the duty of this rod or lever may be to shift a belt, or to perform any function which the character of the machine and other circumstances may suggest. An essential part of the motion is a bar, E, which, in the present instance, has a reciprocating motion, but which, under circumstances explained hereinafter, may be stationary. A rock-frame, F, is pivoted to the main frame A at $a$, and forming part of or attached to this rock-frame is a bearing for a shaft, G, to the upper end of which is secured a worm-wheel, H, the teeth of the latter being adapted to a worm, I, on the shaft B.

In Fig. 1 the rock-frame has fallen by its own weight and that of the wheel to an extent determined by a stop, $d$, and the wheel is out of gear with the worm I; but when the bar E moves in the direction of its arrow, Fig. 1, the inclined upper edge of the said bar, acting on a projection, $e$, of the rock-frame, will raise the same and move the worm-wheel into gear with the worm, and this gearing together of the worm and wheel will continue as long as the rock-frame is under the influence of the bar E. In the upper face of the rim of the wheel are bored a number of holes, into any one of which may be inserted a pin, $f$, the latter, as the wheel revolves, being within range of the projection $h$ at the end of the bar D.

Supposing the shaft B to revolve in the direction of its arrow, and that the bar E has so tilted the rock-frame F that the wheel will be in gear with the worm, the said wheel will turn in the direction of the arrow, and the pin $f$ will gradually approach the projection $h$ of the bar D, and will finally move the same in the direction of its arrow, the movement continuing until the rock-frame ceases to be controlled by the bar E, when the said frame will fall, the wheel will be out of gear with the worm, and the wheel may be restored to its normal position by different appliances—by the weighted cord or chain $i$, for instance, which is attached to and passes round a pulley formed on the hub of the said wheel—this normal position being determined, in the present instance, by a pin, $j$, on the wheel coming in contact with a projection, $k$, on the rock-frame.

The interval which elapses between the time when the wheel is moved into gear and the operation of the bar D will depend upon the position of the pin $f$. The farther away it is from the projection $h$ of the bar when the wheel is in its normal position the longer will be the interval between the moving of the said wheel into gear with the worm and the operation of the rod, and this interval may be regulated according to the exigencies of the machine of which the movement is a part by adjusting the pin $f$ into any one of the holes in the rim of the wheel, or the pin may be made adjustable on the wheel by forming a V or T shaped groove in the rim, making the pin to accord with the groove, and using proper appliances for tightening the pin after adjustment.

The motion arranged and operating as above described may be adopted whenever a positive movement of the bar D or any lever has to be imparted in one direction only, the movement in the other direction being accomplished by other part or parts of the machine to which the movement is attached; but when a positive motion has to be imparted to the bar D first in one direction and then in the opposite direction—as, for instance, when the bar constitutes part of the belt-shifter of a metal-planing machine, and when the motion of the shaft B is reversed on shifting the belt which drives the machine—there should be a second adjustable pin, $f'$, Fig. 2, in the wheel, and the weighted cord or chain and stop $k$ are dispensed with.

In this application of the movement the reciprocating bed of the planer has the bar E, for acting on the rock-frame when the bed is moving in the direction of the arrow, Fig. 1, when the pin $f$ of the wheel H will move the belt-shifter D in the direction of the arrow, Fig. 2, the shaft B being thereby reversed, and a second bar, E', on the planer-bed, the latter being also reversed, will come in contact with an arm, F', on the rock-frame, will tilt the latter and move it into gear with the worm, so that the wheel must turn in a direction contrary to that pointed out by its arrow, and the pin $f'$ must finally move the bar or belt-shifter D in the direction contrary to that indicated by its arrow.

Figure 3:
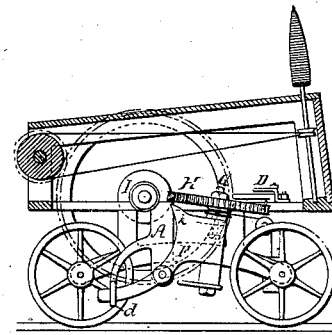

The device as first described—that is, with a continuously revolving shaft, B, a single adjustable pin, $f$, in the wheel H, and a weighted cord or chain to restore the wheel to its normal condition—may be applied to a mule, as shown in Fig. 3; but in this case the rock-frame F is pivoted to the traversing carriage W of a mule, as are also the bearings of the shaft B, the bar E being stationary, so that when the carriage is moved outward in the direction of the arrow, Fig. 3, the projection on the rock-frame will come under the influence of the fixed bar E, the wheel will be moved into gear with the worm, and shortly after this the pin $f$ will strike a bar or lever, D, the movement of which will be communicated to suitable mechanism for arresting or regulating the motion of the spindles and determining the amount of twist to be imparted to the threads.

The device may be applied to many different machines in which a determinate movement has to be imparted from a rotating shaft to any object at predetermined intervals, it being essential, however, in all cases that there shall either be a movable bar or bars, E, for operating the rock-frame when the latter is connected to a fixed frame, or a stationary bar for raising the said rock-frame if the latter is attached to a traversing frame.

An ordinary pinion attached to the shaft B may, in some instances, be substituted for the worm, but the latter is to be preferred in most cases.

I claim as my invention—

A mechanical movement in which the following elements are combined, namely: first, a frame carrying a driving-shaft, B, provided with a worm or pinion, I; second, a rock-frame carrying a wheel, H; third, a device or devices for acting on the rock-frame so that the wheel may be moved into and out of gear with the said worm or pinion; and, fourth, an adjustable pin or pins on the said wheel for operating a bar, lever, or other object at such intervals as may be determined, partly by the position of the pin or pins and partly by that of the device which controls the rock-frame, all substantially as set forth.

In testimony whereof I have signed my name to this specification in the presence of two subscribing witnesses.

HAMILTON L. MOULTON.

Witnesses:
J. HENRY KNOWLES,
GEO. D. HOLT.